Feb. 2, 1965     H. N. G. KING ETAL     3,168,686
PERMANENT MAGNET

Filed Nov. 9, 1959     3 Sheets-Sheet 1

INVENTOR
H. N. G. KING
B. T. MURPHY
BY
AGENT

Feb. 2, 1965 H. N. G. KING ETAL 3,168,686

PERMANENT MAGNET

Filed Nov. 9, 1959 3 Sheets-Sheet 3

INVENTOR
H.N.G. KING
B.T. MURPHY

BY Frank R. Trifari
AGENT

United States Patent Office 3,168,686
Patented Feb. 2, 1965

3,168,686
PERMANENT MAGNET
Hewson Nicholas Graham King, Newdigate, and Bernard Thomas Murphy, Salfords, England, assignors to North American Philips Company, Inc., New York, N.Y., a corporation of Delaware
Filed Nov. 9, 1959, Ser. No. 851,770
Claims priority, application Great Britain, Dec. 24, 1958, 41,654/58
17 Claims. (Cl. 317—201)

This invention relates to an improved form of permanent magnet body.

According to the invention, a permanent magnet body comprises a first permanent magnet and a second permanent magnet magnetized in substantially opposing directions together with a third permanent magnet positioned in contact with and forming a flux path between the first and second permanent magnets, the third permanent magnet being magnetized in such a direction as to inhibit leakage flux from flowing between mutually-facing portions of the first and the second permanent magnets.

The first and second magnets may be arranged to provide on one face of the body a north pole and a south pole, respectively, a surface of the third magnet being positioned to support the north and south poles on the said face.

The third permanent magnet may be magnetized in a direction substantially perpendicular to the said opposing directions.

The face upon which the north and south poles are provided may be a plane. In this case the permanent magnet body may have the shape of a parallelepiped.

Alternatively, the face upon which the north and south poles are provided may be curved. In this case the permanent magnet body may be in the form of an annulus or a portion of an annulus.

In order that the invention may be readily understood embodiments thereof will now be described with reference to the accompanying drawings, wherein.

Figure 1:
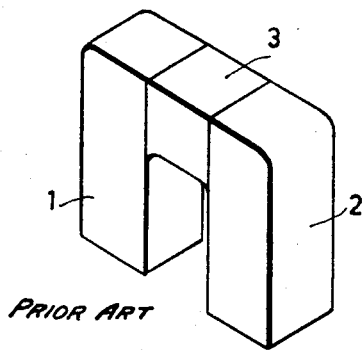
FIG. 1 is a perspective view of a known form of permanent magnet body.
Figure 2:
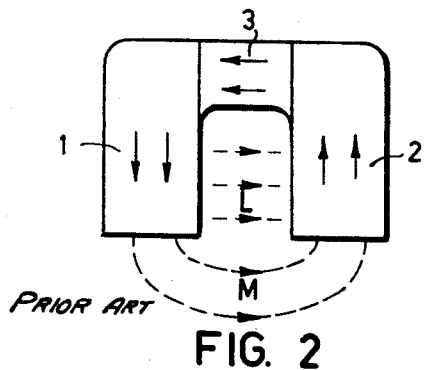
FIG. 2 is the front view of the permanent magnet body of FIG. 1.

Referring to FIGURES 1 and 2 a known form of permanent magnet body comprised two limbs 1 and 2, and a center portion 3 magnetized in the directions indicated by the arrows. With this arrangement leakage flux L will flow between adjacent side faces of the limbs 1 and 2 so that the total flux is greater than the useful main flux M.

Figure 3:
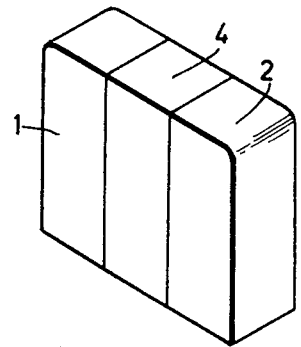
FIG. 3 is a perspective view of one embodiment of the permanent magnet body of this invention.
Figure 4:
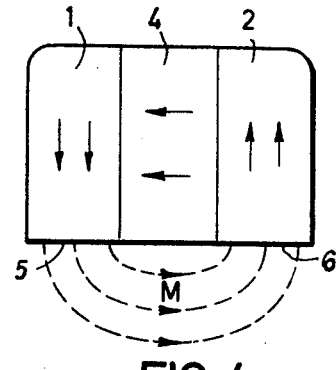
FIG. 4 is a front view of the permanent magnet body of FIG. 3.

Referring now to FIGURES 3 and 4, a parallelepiped permanent magnet body comprises limb portions 1 and 2 which in this example may be regarded as being substantially identical with the limbs 1 and 2 in FIGURES 1 and 2 and which are magnetized in the same direction as those limbs. A center portion 4 is magnetized in a direction perpendicular to the direction of magnetization in limbs 1 and 2, similar to the center portion 3 previously described. The portion 4, however, extends so as to form a continuous surface with the pole faces 5 and 6, respectively, of the limbs 1 and 2 so that leakage flux cannot flow between adjacent side faces of the limbs. Therefore, in the arrangement illustrated in FIGURES 3 and 4, the main flux M is greater than in the magnet illustrated in FIGURES 1 and 2.

Figure 5:
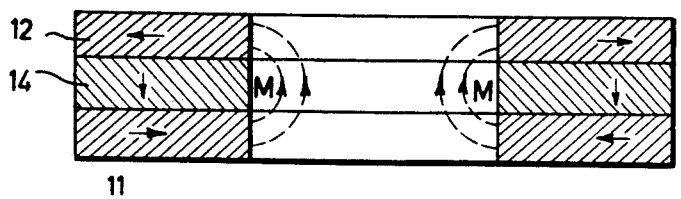
FIG. 5 is a cross sectional view of another embodiment of the permanent magnet body of this invention.

FIGURE 5 shows a second embodiment comprising an annular magnet body having portions 11 and 12 which are radially magnetized and a center portion 14 magnetized in an axial direction. In a modification, not shown, a body is in the form of a portion of an annulus so that a complete annular arrangement may be built up from a plurality of bodies.

Figure 6:
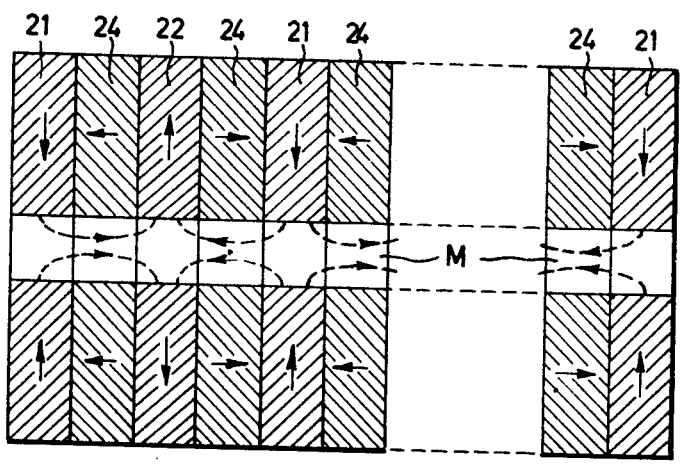
FIG. 6 is a cross sectional view of still another embodiment of the permanent magnet body of this invention.

FIGURE 6 shows an arrangement of ring magnets built up to form an axial periodic field. Such an arrangement is used for focusing an electron beam in a travelling-wave tube. In this embodiment rings 21 are radially magnetized in one direction. Rings 22 are radially magnetized in the opposite direction and alternate with the rings 21. Between each adjacent ring 21 and 22 is a ring 24, the rings 24 being alternately magnetized in opposite axial directions. The field distribution within the assembly is indicated at M.

Figure 7:
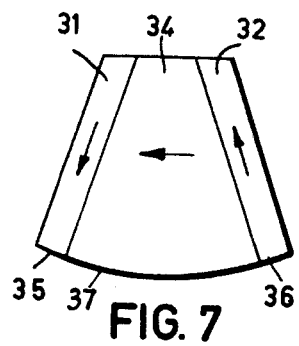
FIGS. 7 and 8 are front views of other modified forms of the embodiment of FIGS. 3, 4.

FIGURE 7 shows an embodiment which is somewhat similar to the embodiment shown in FIGURE 4. In this embodiment the opposing directions of magnetization of outer limbs 31 and 32 are not parallel, due to the geometrical configuration of the assembly. The surface, to which the opposing magnetization directions of limbs 31 and 32 are normal and which is formed by the pole faces 35 and 36 and the face 37 of the center magnet 34, is curved instead of being planar as in FIGURE 4.

Figure 8:
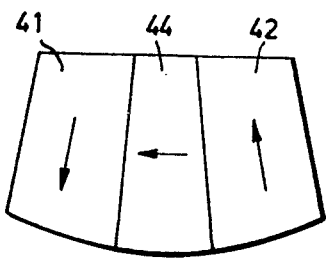

FIGURE 8 is a side view of a further embodiment having limb portions 41 and 42 and a center portion 44.

Figure 9:
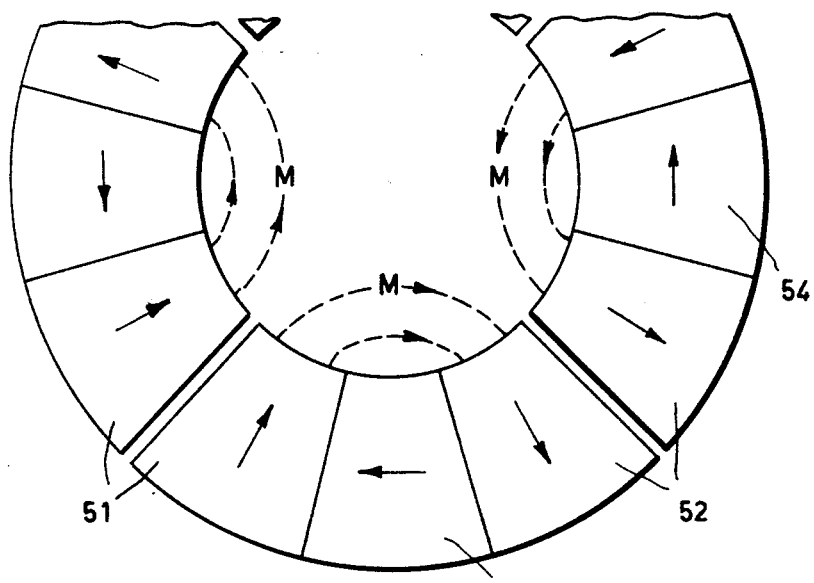
FIG. 9 is a partial front view of still another embodiment of the permanent magnet body of this invention.

FIGURE 9 illustrates an embodiment wherein an annular magnetic assembly comprises four magnet bodies each of which consists of portions 51 and 52, respectively, magnetized in opposing radial directions and a portion 54 magnetized in a direction perpendicular to the radius and to the axis of the assembly. Such an arrangement is suitable for the field magnet assembly for a small electric motor or generator.

Figure 10:
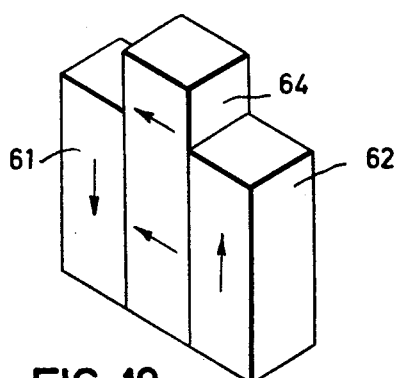
FIG. 10 is a perspective view of still another embodiment of the permanent magnet body of this invention.

FIGURE 10 illustrates an embodiment similar to the embodiment shown in FIGURES 3 and 4. In this embodiment limb portions 61 and 62 are supported by a center portion 64 which extends beyond the limb portions 61 and 62.

Figure 11:
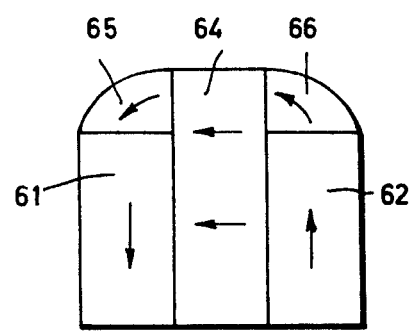
FIG. 11 is a front view of a modified form of the embodiment of FIG. 10.

FIGURE 11 illustrates a modification of the embodiment illustrated in FIGURE 10. In this modification the magnet body comprises limb portions 61 and 62 and a center portion 64 as illustrated in FIGURE 10. The spaces between the upper ends of the limb portions 61 and 62 and the upper said faces of the center portion 64 are filled in by means of shaped members 65 and 66. These members 65 and 66 may be of a soft magnetic material or alternatively they may be of permanent magnets, in which case they would preferably, but not necessarily, be magnetized in the directions indicated by the curved arrows.

What is claimed is:

1. A permanent magnet comprising a body having three adjoining and aligned permanent magnet portions forming along one face of the magnet a substantially continuous surface, the outer two magnet portions being magnetized in substantially opposite directions substantially orthogonally to the said one face, the center magnet portion being magnetized in a direction substantially at right angles to the magnetizing directions of the outer magnet portions and in a plane substantially parallel to the plane defined by the magnetizing directions of said outer two magnet portions, the magnet producing a strong, useful external field adjacent the said one face.

2. A permanent magnet comprising at least one body having first and second end permanent magnet portions and a third intermediate permanent magnet portion in adjoining relationship with each of said first and second magnet portions, said first, second and third magnet portions being aligned to form at least one face of said body, said face having a substantially continuous surface with a predetermined degree of curvature, said first and second permanent magnet portions being magnetized in substantially opposite directions normal to said surface, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a magnetic field adjacent to said one face.

3. A permanent magnet comprising at least one body having first and second end permanent magnet portions and a third intermediate permanent magnet portion in adjoining relationship with each of said first and second magnet portions, said first, second and third magnet portions being aligned to form at least one face of said body, said face having a substantially continuous surface with substantially a zero degree of curvature, said first and second permanent magnet portions being magnetized in substantially opposite directions normal to said surface, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a magnetic field adjacent to said one face.

4. A permanent magnet comprising a body in the form of a parallelepiped and comprising first and second end permanent magnet portions and a third intermediate permanent magnet portion adjoining each of said first and second magnet portions, said first, second and third magnet portions being aligned to form along one face of the magnet a substantially continuous surface and each having respective longitudinal axes thereof normal to said one face, said first and second permanent magnet portions being magnetized in substantially opposite directions normal to said one face, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a useful magnetic field adjacent to said one face.

5. A permanent magnet according to claim 4 wherein said first, second and third magnet portions have respective said longitudinal axes of substantially equal lengths.

6. A permanent magnet according to claim 4, wherein said first and second magnet portions have respective said longitudinal axes of substantially equal lengths, and said third magnet portion has a respective said longitudinal axis greater than the length of said longitudinal axis of each of said first and second magnet portions which causes said third magnet portion to have a projection which extends past said first and second portions.

7. A permanent magnet according to claim 6 further comprising ferromagnetic material in adjoining relationship with the projection of said third portion and each of said first and second portions.

8. A permanent magnet according to claim 7 wherein said ferromagnetic material is permanently magnetic.

9. A permanent magnet comprising at least one body having first and second end permanent magnet portions and a third intermediate permanent magnet portion in adjoining relationship with each of said first and second magnet portions, said first, second and third magnet portions being aligned to form at least one face of said body, said face having a substantially continuous surface with a predetermined degree of curvature greater than zero, said first and second permanent magnet portions being magnetized in substantially opposite directions normal to said surface, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a magnetic field adjacent to said one face.

10. A permanent magnet comprising at least one body having first and second end permanent magnet portions and a third intermediate permanent magnet portion in adjoining relationship with each of said first and second magnet portions, said first, second and third magnet portions being aligned to form at least one face of said body, said face having a substantially continuous convex surface, said first and second permanent magnet portions being magnetized in substantially opposite directions normal to said surface, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a magnetic field adjacent to said one face.

11. A permanent magnet comprising at least one body having the composite form of a circumferential section of a given annulus, said circumferential section having a predetermined angular length, said body comprising first and second end permanent magnet portions and a third intermediate permanent magnet portion in adjoining relationship with each of said first and second magnet portions, each of said first, second and third magnet portions having the form of a circumferential section of predetermined angular length of said given annulus and being aligned with respect to each other to form said compositely formed body, said portions having the respective concave circumferential surfaces thereof being aligned to form the concave circumferential face of said annulus section compositely formed body, each of said first and second permanent magnet portions being magnetized in substantially opposite directions normal to said face, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a magnetic field adjacent to said one face.

12. A permanent magnet according to claim 11 wherein said three magnet portions are aligned in substantially the same plane, said last mentioned plane being substantially normal to the center axis of said given annulus.

13. A permanent magnet according to claim 11 wherein said three magnet portions are in mutually exclusive planes, each of said mutually exclusive planes being substantially normal to the center axis of said given annulus.

14. A permanent magnet comprising an apertured annular body having a center axis and comprising at least three adjoining and axially-aligned permanet magnet annular portions forming along the face of the magnet bounding the aperture a substantially continuous surface, the first and third magnet portions being magnetized in substantially opposite directions substantially orthogonally to the said one face, the second magnet portion being intermediate said first and third magnet portions and magnetized in a direction substantially at right angles to the magnetizing directions of the first and third magnet portions, said magnet providing a useful magnetic field adjacent to said one face.

15. A permanent magnet for producing an internal periodically reversing magnetic field, comprising a stacked array of magnets as claimed in claim 14, wherein the odd-numbered magnets are magnetized radially and in opposite senses, and the even-numbered magnets are magnetized axially and in opposite senses.

16. A permanent magnet network having a body adapted to be aligned with other similar bodies as associated parts of said permanent magnet network, each of said bodies comprising first and second end permanent magnet portions and a third intermediate permanent magnet portion in adjoining relationship with each of said first and second magnet portions, said first, second and third magnet portions being aligned with respect to each other to form at least one face of said body, said face having a substantially continuous concave surface of a predetermined angular length, said first and second permanent magnet portions being magnetized in substantially opposite directions normal to said concave surface, and said third intermediate magnet portion being magnetized in a direction substantially normal to the magnetizing directions of said first and second magnet portions and in a plane substantially parallel to the plane defined by the magnetizing directions of said first and second magnet portions, said magnet providing a magnetic field adjacent to said one face.

17. A permanent magnet network according to claim 16 wherein said bodies are aligned substantially in the same plane and the total angular length of the respective concave surfaces thereof is substantially 360 degrees, said last mentioned plane being substantially normal to the axis of origin of said concave surfaces.

References Cited in the file of this patent

UNITED STATES PATENTS

| | | |
|---|---|---|
| 2,722,617 | Cluwen et al. | Nov. 1, 1955 |
| 2,727,650 | Maynihan et al. | Dec. 20, 1955 |
| 2,830,207 | Clark | Apr. 8, 1958 |
| 2,908,329 | Weber | Sept. 8, 1959 |
| 2,972,485 | Ferchland | Feb. 21, 1961 |
| 2,981,871 | Westmijze | Apr. 25, 1961 |

FOREIGN PATENTS

| | | |
|---|---|---|
| 768,518 | Great Britain | Feb. 20, 1957 |
| 216,080 | Austria | July 17, 1958 |